United States Patent [19]
Young et al.

[11] Patent Number: 4,749,673
[45] Date of Patent: Jun. 7, 1988

[54] HYDROTREATING CATALYSTS COMPRISING SUPPORTED MIXTURES OF A SULFIDE OF TRIVALENT CHROMIUM AND MOLYBDENUM OR TUNGSTEN

[75] Inventors: Archie R. Young, Montclair; Teh C. Ho, Bridgewater; Allan J. Jacobson, Princeton; Russell R. Chianelli, Somerville, all of N.J.

[73] Assignee: Exxon Research and Engineering Company, Florham Park, N.J.

[21] Appl. No.: 897,323

[22] Filed: Aug. 18, 1986

Related U.S. Application Data

[62] Division of Ser. No. 656,146, Sep. 28, 1984, Pat. No. 4,622,128.

[51] Int. Cl.$^4$ .................... B01J 27/051; B01J 27/047; B01J 31/18
[52] U.S. Cl. .................................. 502/220; 502/167; 502/219
[58] Field of Search ...................... 502/167, 220, 219

[56] References Cited

U.S. PATENT DOCUMENTS

| | | | |
|---|---|---|---|
| 3,116,234 | 12/1963 | Douwes | 208/208 R |
| 4,431,747 | 2/1984 | Seiver et al. | 502/220 |
| 4,591,429 | 5/1985 | Ho et al. | 502/220 |
| 4,595,672 | 6/1986 | Ho et al. | 502/162 |

Primary Examiner—Paul E. Konopka
Attorney, Agent, or Firm—Edward M. Corcoran; Joseph J. Dvorak

[57] ABSTRACT

Supported hydroprocessing catalysts comprising a sulfide of trivalent chromium and Mo, W or mixture thereof are obtained by compositing a preselected quantity of support material with a precursor comprising a mixture of (i) a hydrated oxide of trivalent chromium and (ii) a salt containing a thiometallate anion of Mo or W and a cation comprising the conjugate acid of at least one neutral, nitrogen-containing polydentate ligand and heating the composite in the presence of sulfur and hydrogen in an oxygen-free atmosphere. These compositions have been found to be useful hydrotreating catalysts having nitrogen removal activity superior to that of commercial catalysts derived from cobalt molybdate on alumina.

17 Claims, No Drawings

HYDROTREATING CATALYSTS COMPRISING SUPPORTED MIXTURES OF A SULFIDE OF TRIVALENT CHROMIUM AND MOLYBDENUM OR TUNGSTEN

This is a division, of application Ser. No. 656,146, filed 9/28/84, now U.S. Pat. No. 4,622,128.

BACKGROUND OF THE INVENTION

1. Field of the Invention

This invention relates to a process for the preparation of supported, chromium-containing molybdenum and/or tungsten sulfide catalysts, the supported species prepared by such process, and to the use of such supported catalysts for hydroprocessing processes, particularly hydrotreating. More particularly, this invention relates to the preparation and use of supported catalysts useful for hydroprocessing processes such as hydrotreating wherein said catalysts are formed by heating, at elevated temperature, in the presence of sulfur and under oxygen-free conditions, a composite of a support material and one or more precursor compounds comprising a mixture of (i) a hydrated oxide of trivalent chromium and (ii) a thiometallate salt of the general formula $(L')(Mo_yW_{1-y}S_4)$, wherein y is any value ranging from 0 to 1, and wherein L' is the conjugate acid of one or more ligands, L, with a charge sufficient to balance the dinegative charge of the thiometallate anion.

2. Background of the Disclosure

The petroleum industry is increasingly turning to heavy crudes, resids, coal and tar sands as sources for future feedstocks. Feedstocks derived from these heavy materials contain more sulfur and nitrogen than feedstocks derived from more conventional crude oils. These feeds therefore require a considerable amount of upgrading in order to obtain usable products therefrom, such upgrading or refining generally being accomplished by hydrotreating processes which are well-known in the petroleum industry.

These processes require the treating with hydrogen of various hydrocarbon fractions, or whole heavy feeds, or feedsdtocks, in the presence of hydrotreating catalysts to effect conversion of at least a portion of the feeds, or feedstocks to lower molecular weight hydrocarbons, or to effect the removal of unwanted components, or compounds, or their conversion to innocuous or less undesirable compounds. Hydrotreating may be applied to a variety of feedstocks, e.g., solvents, light, middle, or heavy distillate feeds and residual feeds, or fuels. In hydrotreating relatively light feeds, the feeds are treated with hydrogen, often to improve odor, color, stability, combustion characteristics, and the like. Unsaturated hydrocarbons are hydrogenated. Sulfur and nitrogen are removed in such treatments. In the hydrodesulfurization (HDS) of heavier feedstocks, or residua, the sulfur compounds are hydrogenated and cracked. Carbon-sulfur bonds are broken, and the sulfur for the most part is converted to hydrogen sulfide which is removed as a gas from the process. Hydrodenitrogenation (HDN), to some degree also generally accompanies hydrodesulfurization reactions. In the hydrodenitrogenation of heavier feedstocks, or residua, the nitrogen compounds are hydrogenated and cracked. Carbon-nitrogen bonds are broken, and the nitrogen is converted to ammonia and evolved from the process. Hydrodesulfurization, to some degree also generally accompanies hydrodenitrogenation reactions. In the hydrodesulfurization of relatively heavy feedstocks, emphasis is on the removal of sulfur from the feedstock. In the hydrodenitrogenation of relatively heavy feedstocks emphasis is on the removal of nitrogen from the feedstock. Albeit, hydrodesulfurization and hydrodenitrogenation reactions generally occur together, it is usually far more difficult to achieve effective hydrodenitrogenation of feedstocks than hydrodesulfurization of feedstocks.

Catalysts precursors most commonly used for these hydrotreating reactions include materials such as cobalt molybdate on alumina, nickel on alumina, cobalt molybdate promoted with nickel, nickel tungstate, etc. Also, it is well-known to those skilled in the art to use certain transition metal sulfides such as cobalt and molybdenum sulfides and mixtures thereof to upgrade oils containing sulfur and nitrogen compounds by catalytically removing such compounds in the presence of hydrogen, which processes are collectively known as hydrotreating or hydrorefining processes, it being understood that hydrorefining also includes some hydrogenation of aromatic and unsaturated aliphatic hydrocarbons. Thus, U.S. Pat. No. 2,914,462 discloses the use of molybdenum sulfide for hydrodesulfurizing gas oil and U.S. Pat. No. 3,148,135 discloses the use of molybdenum sulfide for hydrorefining sulfur and nitrogen-containing hydrocarbon oils. U.S. Pat. No. 2,715,603, discloses the use of molybdenum sulfide as a catalyst for the hydrogenation of heavy oils. Molybdenum and tungsten sulfides have other uses as catalysts in reactions such as hydrogenation, methanation and water gas shift.

In general, with molybdenum and other transition metal sulfide catalysts as well as with other types of catalysts, higher catalyst surface areas result in more active catalysts than similar catalysts with lower surface areas. Thus, those skilled in the art are constantly trying to achieve catalysts that have higher surface areas. More recently, it has been disclosed in U.S. Pat. Nos. 4,243,553, and 4,243,554 that molybdenum sulfide catalysts of relatively high surface area may be obtained by thermally decomposing selected thiomolybdate salts at temperatures ranging from 300°–800° C. in the presence of essentially oxygenfree atmospheres. Suitable atmospheres are disclosed as consisting of argon, a vacuum, nitrogen and hydrogen. In U.S. Pat. No. 4,243,554 an ammonium thiomolybdate salt is decomposed by heating at a rate in excess of 15° C. per minute, whereas in U.S. Pat. No. 4,243,553, a substituted ammonium thiomolybdate salt is thermally decomposed at a very slow heating rate of from about 0.5° to 2° C./min. The processes disclosed in these patents are claimed to produce molybdenum disulfide catalysts having superior properties for water gas shift and methanation reactions and for catalyzed hydrogenation or hydrotreating reactions.

Catalysts comprising molybdenum sulfide in combination with other metal sulfides are also known. Thus, U.S. Pat. No. 2,891,003 discloses an ironchromium combination for desulfurizing olefinic gasoline fractions; 3,116,234 discloses Cr-Mo for HDS and U.S. Pat. No. 3,265,615 discloses Cr-Mo for HDN and HDS.

SUMMARY OF THE INVENTION

This invention relates to a process for the preparation of supported, chromium-containing molybdenum and/or tungsten sulfide catalysts, the supported species prepared by such process, and to the use of such supported catalysts for hydroprocessing processes, particularly hydrotreating. More particularly, this invention relates to the preparation and use of supported catalysts useful for hydroprocessing processes such as hydrotreating wherein said catalysts are formed by heating, at elevated temperature, in the presence of sulfur and under oxygen-free conditions, a composite of a support material and one or more precursor compounds comprising a mixture of (i) a hydrated oxide of trivalent chromium and (ii) a thiometallate salt of the general formula (L') (Mo$_y$W$_{1-y}$S$_4$), wherein y is any value ranging from 0 to 1, and wherein L' is the conjugate acid of one or more ligands, L, with a charge sufficient to balance the dinegative charge of the thiometallate anion.

Hydroprocessing catalyst is meant to include catalysts useful for any process that is carried out in the presence of hydrogen, including, but not limited to, hydrocracking, hydrodenitrogenation, hydrodesulfurization, hydrogenation of aromatic and aliphatic unsaturated hydrocarbons, methanation, water gas shift reactions, etc. These reactions include hydrotreating and hydrorefining reactions, the difference generally being thought of as more of a difference in degree than in kind, with hydrotreating conditions being more severe than hydrorefining conditions. The ligand L is one or more neutral, nitrogen-containing ligands at least one of which is a chelating polydentate ligand. In a particularly preferred embodiment, the oxygen-free conditions will be an atmosphere comprising a gaseous mixture of hydrogen and hydrogen sulfide.

Hydroprocessing catalyst is meant to include catalysts useful for any process that is carried out in the presence of hydrogen, including, but not limited to, hydrocracking, hydrodenitrogenation, hydrodesulfurization, hydrogenation of aromatic and aliphatic unsaturated hydrocarbons, methanation, water gas shift reactions, etc. These reactions include hydrotreating and hydrorefining reactions, the difference generally being thought of as more of a difference in degree than in kind, with hydrotreating conditions being more severe than hydrorefining conditions.

DETAILED DESCRIPTION OF THE INVENTION

The precise nature and composition of the catalyst species that is formed as a result of heating the composite of precursor and support material in the presence of sulfur and under oxygen-free conditions is not known. The composition of the corresponding unsupported catalyst species is defined in U.S. patent application Ser. No. 656,145 jointly filed by A. J. Jacobson, T. C. Ho, R. R. Chianelli, J. J. Steger and A. A. Montagna on even date herewith. Unlike applicants' species, however, the catalyst species of Jacobson et al. are unsupported, bulk catalysts. They thus differ from the supported catalysts species defined herein in that the catalyst species of this invention achieve superior utilization of the catalytic material.

The compositions of the corresponding unsupported species comprise a mixture of (i) an amorphous sulfide of trivalent chromium and (ii) microcrystallites of metal sulfide of a metal selected from the group consisting of Mo, W and mixtures thereof. By amorphous is meant a compound which exhibits no detectable crystallinity when measured by X-ray diffraction. Bulk, unsupported catalyst species defined in co-pending Ser. No. 656,145 which were analyzed by X-ray diffraction exhibited no detectble crystallinity for the chromium sulfide and, when analyzed by high resolution scanning transission electron microscopy (HREM) with a microscope having a 4Å point-to-point resolution, revealed the presence of less than 5% of the total Cr$_2$S$_3$ in detectable crystalline form. By microcrystallites (of tungsten or molybdenum sulfide) is meant crystals whose major dimensions are less than about 0.1 microns by 0.01 microns, preferably less than 0.05 microns by 0.01 microns, and still more preferably less than 0.015 microns by 0.005 microns.

Analysis of the bulk, unsupported species has revealed that they can be expressed by the illustrative, but non-limiting general formula [x(Mo or W)S$_a$](Cr$_2$S$_b$) wherein $1.5<a<3.5$, $1.5<b<4.5$ and $0<x<4$. It is preferred that $1.8<a<2.4$ and $2.7<b<3.2$. Chemical analysis of the bulk, unsupported composition prepared in Example 1, below, revealed it to be Cr$_{0.811}$ MoS$_{3.15}$ which can be written in the general form as (2.47 MoS$_2$) (Cr$_2$S$_3$). The chemical analysis, performed at high spatial resolution in the electron microscope, also indicated microcrystallites of MoS$_2$ as highly dispersed on or in the amorphous Cr$_2$S$_3$.

As set forth above, this invention relates to a process for the preparation of supported, chromiumcontaining molybdenum and/or tungsten sulfide catalysts, the supported species prepared by such process, and to the use of such supported catalysts for hydroprocessing processes, particularly hydrotreating. More particularly, this invention relates to the preparation and use of supported catalysts useful for hydroprocessing processes such as hydrotreating wherein said catalysts are formed by heating, at elevated temperature, in the presence of sulfur and under oxygen-free conditions, a composite of a support material and one or more precursor compounds comprising a mixture of (i) a hydrated oxide of trivalent chromium and (ii) a thiometallate salt of the general formula (L') (Mo$_y$W$_{1-y}$S$_4$), wherein y is any value ranging from 0 to 1, and wherein L' is the conjugate acid of one or more ligands, L, with a charge sufficient to balance the dinegative charge of the thiometallate anion.

In one method of preparing the supported catalysts species of this invention, a slurry of precursor material is incorporated with a pre-selected quantity of refractory inorganic oxide support material, preferably a particulate mass of said support, with the resulting composite then dried and the dried, particulate, composite then heated in an oxygen-free atmosphere in the presence of sulfur or sulfur-bearing compound at elevated temperature to form the catalyst species of this invention. Suitable, sufficient amounts of the precursor is incorporated on the support so that prior to, or at the time that the composite of support and precursor material is heated in the presence of sulfur and hydrogen, generally from about 10 weight percent to about 25 weight percent of the salt, expressed as weight of MoO$_3$ or WO$_3$ on an ignition loss free basis, will be present on the support. The supported catalyst species of this invention are highly active and selective as hydrotreating catalysts.

The catalyst support will typically be a particulate, porous refractory inorganic oxide in the form of beads, pills, pellets, sieved particles, extrudates, or the like in dry or solvated state which is contacted with a slurry of precursor. Alternatively, the supported catalyst species of this invention are formed by forming the precursor in the presence of a slurry of colloidal or non-colloidal particles of support material. Typical support materials include alumina, diatomaceous earth, zeolite, silica, activated carbon, magnesia, zirconia, boria, chromia, titania and the like. A preferred support for the practice of the present invention is one having a surface area of more than 50 m²/g, preferably from about 100 to 300 m²/g.

As stated above the catalysts of this invention may be prepared from a composite of inorganic refractory oxide support material and one or more precursors wherein said precursors comprise a mixture of (i) a hydrated oxide of trivalent chromium and (ii) a thiometallate salt of the general formula (L') $(Mo_yW_{1-y}S_4)$, wherein y is any value ranging from 0 to 1 and L' is the conjugate acid of one or more ligands, L, with a charge sufficient to balance the dinegative charge of the thiometallate anion. Ligand L will be one or more neutral, nitrogen containing ligands wherein at least one of said ligands is a multidentate chelating ligand. The ligand, in its conjugate acid form, forms a cation $[L']^{2+}$. Thus, the catalytic metal sulfide anion $(Mo_yW_{1-y}S_4)^{2-}$ will be ionically bound to the cation. By neutral is meant that the ligand itself does not have a charge.

Those skilled in the art know that the term "ligand" is used to designate functional coordinating groups which have one or more pairs of electrons available for the formation of coordinate bonds. Ligands that can form more than one bond with a metal ion are called polydentate while ligands that can form only one bond with a metal ion are called monodentate. Monodentate ligands are not capable of forming chelates. Hence, if one uses one or more species of monodentate ligands in the precursor molecule, then one must also use more than one polydentate chelating ligand. Preferably L will be one or more polydentate chelating ligands. The total denticity of the ligand species comprising L will be six. Thus, L will be three bidentate ligands, two tridentate ligands, a mixture of a bidentate and a quadridentate ligand, a hexadentate ligand or a mixture of a polydentate ligand with monodentate ligands as long as the combination has a total denticity of six. As has heretofore been stated, it is preferred to use chelating bidentate and tridentate alkylamine ligands. In general, the ligands useful in this invention include alkyl and aryl amines and nitrogen heterocycles. Illustrative but nonlimiting examples of ligands useful in the catalyst precursors of this invention are set forth below.

Monodentate ligands will include $NH_3$ as well as alkyl and aryl amines such as ethylamine, dimethyl amine, o-phenylene diamine and nitrogen heterocyclic amines such as pyridine, etc. Useful chelating bidentate amine ligands are illustrated by ethylenediamine, 2,2'-bipyridine, o-phenylene diamine, tetramethylethylenediamine and propane-1,3 diamine. Similarly, useful chelating tridentate amine ligands are represented by terpyridine and diethylenetriamine, while triethylenetetramine is illustrative of a useful chelating quadridentate amine ligand. Useful chelating pentadentate ligands include tetraethylene pentamine while sepulchrate (an octazacryptate) is illustrative of a suitable chelating hexadentate ligand. As a practical matter it will be preferred to use chelating, polydentate alkyl amines. Illustrative, but not limiting examples of alkyl amines that are useful in the catalyst precursor of this invention include ethylenediamine, diethylenetriamine, and tetraethylenetetramine. It is particularly preferred to use bidentate and tridentate alkyl amines such as ethylenediamine(en) and diethylenetriamine(dien).

The conjugate acid of ligand L, referred to as L', will have a charge sufficient to balance the dinegative charge of the thiometallate anion. For example, if L is ethylenediamine (en), L' will be $[H_2en]^{2+}$ and the corresponding thiomolybdate salt, for example, will be $[H_2en]_3(MoS_4)$. For diethylene triamine, (dien), the corresponding salt will be $[H_2dien]_2(MoS_4)$.

In general, the precursors useful for forming the compositions of this invention may be prepared by mixing a slurry of a hydrated oxide of trivalent chromium $Cr(OH)_3 \cdot xH_2O$, with one or more of the thiometallate salts containing the conjugate acid of one or more ligands, precipitating the thiometallate salt onto the slurried particles of hydrated chromium oxide and recovering the precursor. The hydrated chromium oxide may be freshly precipitated from an aqueous solution of a trivalent chromium salt. Alternatively, the source of hydrated chromic oxide may be a colloidal, aqueous suspension of same. Still further, the precursor may be formed according to this method in the presence of a slurry or colloidal suspension of support material. In one method of preparation the hydrated chromium oxide will be precipitated from an aqueous solution of trivalent chromium salt by contacting said salt solution with one or more basic amine chelating agents.

In one embodiment, a water soluble trivalent chromium compound is dissolved in water and hydrated chromium oxide is precipitated by addition of a ligand, L, or a mixture of ligands, L. This procedure produces a slurry or suspension of very fine particles of a hydrated oxide of trivalent chromium in the aqueous phase, which also contains some free ligand L, and some of the conjugate acid of the ligand L, L'. When the conjugate acid is a strong acid, that is if the ligand L is a weak base, than a quantity of ammonium hydroxide may be added to precipitate the chromium. The water soluble chromium salt may be any water soluble salt that is convenient to use such as halide, sulfate, nitrate, etc. The hydrated chromium oxide slurry is then mixed with a solution of the thiometallate prepared by dissolving ammonium thiometallate in an excess of the ligand or mixture of ligands. A small amount of water may be added if desired. On mixing the slurry with the thiometallate solution an orange-red colored precipitate forms which is recovered by filtration. This precipitate will be a precursor of a composition of this invention. If this precipitate is formed in the presence of a suitable support material, then one will obtain a composite of support material and precursor salt. If the chromia is present in sufficient amount, then the excess will comprise all or a portion of the support.

The salts (L') $(Mo_yW_{1-y}S_4)$ may generally be prepared by dissolving the ammonium thiometallate in excess of the ligand L. The salt is recovered as a precipitate by addition of water or some other suitable antisolvent such as methanol or acetone. If desired, these salts may be formed in the presence of one or more precursor materials as well as in the presence of one or more support materials.

The compositions or catalysts of this invention will be prepared by heating a composite of support material and one or more precursors, in an oxygen-free environment in the presence of sulfur at a temperature of at least about 200° C. for a time sufficient to form the catalyst. Although the sulfur required during the formation of the catalyst may be present in the precursor, it is preferred that the sulfur be present in an amount in excess of that contained in the precursor. Thus, it is preferred that the composition be formed by heating the precursor in the presence of excess sulfur in the form of a sulfur bearing compound. Mixtures of hydrogen and H₂S have been found to be particularly suitable. Preferably the temperature will range between from about 250°-600° C., more preferably from about 250°-500° C. and still more preferably from about 300°-400° C. The oxygen-free environment may be gaseous, liquid or mixture thereof.

The compositions of the bulk, unsupported catalysts species of Jacobsen, et al. were established using a number of analytical techniques briefly described below.

X-ray diffraction (XRD) analysis was done by grinding a sample to fine powder and packing it into an alumina tray, containing a cylindrical recess 25 mm in diameter and 1 mm in depth. The top surface of the sample was flat and co-planar with the top of the aluminum tray after this preparation. Measurements were made in ambient atmosphere using a Siemens D500 X-ray diffractometer in $\theta-2\theta$ reflection (Bragg-Brentano) geometry. The incident X-ray beam was taken from a fixed anode copper target with a wavelength of 1.54178 Å. The diffracted beams were monochromated using a graphite monochromator to minimize fluorescence and were detected using a proportional counter detector. Data were collected by stepping the detector in angular increments of $0.020°2\theta$ and counting at each step for two seconds. The intensity and angular information were stored in a PDP 1103 computer and subsequently plotted as detected counts in 2 seconds versus $2\theta$.

The morphology and crystal structure determination of the constituent phases were carried out using high resolution and analytical electron microscopy. In this procedure, described in P. C. Flynn et al., J. Catal., 33, 233–248 (1974), the transition metal sulfide powder is prepared for the Transmission Electron Microscope (TEM) by crushing in an agate mortar and pestle to produce powder fragments through which an electron beam can pass. The crushed powder is ultrasonically dispersed in hexane and a drop of this suspension is allowed to dry onto a standard 3 mm TEM grid, which is covered with a thin ($\leq 200$ Å) amorphous carbon film. Samples were analyzed in a Philips 400T FEG TEM at 100 KV by bright field imaging, energy dispersive X-ray microanalysis, and microdiffraction.

Quantitative chemical analysis was obtained by the thin foil ratio method, as described in G. Cliff and G. W. Lovimer; J. Microscopy, 1975, Volume 103, Page 203, and absorption effects were analyzed and corrected using the procedure described by Goldstein, et al. in "Introduction to Analytical Electron Microscopy", J. J. Hren, J. I. Goldstein, and D. C. Joy eds, Plenum Press, New York, NY 1979, Page 83. X-ray fluorescent spectra was generated from the excited volume of a sample defined by a cylinder of 100 Å probe size and the thickness of the sample (typically 1000 Å).

As discussed under Background of the Disclosure, molybdenum and tungsten sulfide catalysts have many uses, including hydrotreating. Hydrotreating conditions vary considerably depending on the nature of the hydrocarbon being hydrogenated, the nature of the impurities or contaminants to be reacted or removed, and, inter alia, the extent of conversion desired, if any. In general however, the following Table illustrates typical conditions for hydrotreating a naphtha boiling within a range of from about 25° C. to about 210° C., a diesel fuel boiling within a range of from about 170° C. to 350° C., a heavy gas oil boiling within a range of from about 325° C. to about 475° C., a lube oil feed boiling within a range of from about 290° to 550° C., or residuum containing from about 10 percent to about 50 percent of a material boiling above about 575° C.

| Typical Hydrotreating Conditions | | | | |
|---|---|---|---|---|
| Feed | Temp., °C. | Pressure psig | Space Velocity V/V/Hr | Hydrogen Gas Rate SCF/B |
| Naphtha | 100–370 | 150–800 | 0.5–10 | 100–2000 |
| Diesel Fuel | 200–400 | 250–1500 | 0.5–4 | 500–6000 |
| Heavy Gas Oil | 260–430 | 250–2500 | 0.3–2 | 1000–6000 |
| Lube Oil | 200–450 | 100–3000 | 0.2–5 | 100–10,000 |
| Residuum | 340–450 | 1000–5000 | 0.1–1 | 2000–10,000 |

It should be noted that the compositions of this invention are useful catalysts for lube oil refining processes where it is desirable to remove oxidation initiating nitrogen compounds from lube oil feeds.

The invention will be further understood by reference to the following examples.

EXAMPLES

Example 1

Precursor Preparation

A chromium thiomolybdate catalyst precursor was prepared by dissolving 40 grams of ammonium thiomolybdate into 82 ml of diethylenetriamine in a 1 liter flask which formed a dark red solution. The sides of the flask were washed with distilled water and the flask was cooled to 0° C. In a separate flask 27.56 grams of $CrCl_3.6H_2O$ was dissolved into 250 ml of distilled water. Diethylenetriamine (dien), 25 ml, was added to form a precipitate. The resulting slurry was allowed to stand for 2–3 hours and then added slowly, with agitation, to the $(NH_4)_2MoS_4$/dien solution. This resulted in the formation of a bright orange precipitate which was than stirred while on the ice bath for a half hour after the addition was completed. The precipitate was then separated by filtration, washed with water and ethanol and dried at ambient temperature under vacuum. Ninety-one grams of precursor were recovered as an orange colored precipitate. The precursor had the approximate (calculated) formula $[Cr(OH)_3.1.5H_2O](H_2dien)_{1.1}(MoS_4)_{1.1}$. Elemental analysis of the precursor is set forth below in wt.%.

| | Cr | Mo | S | C | H | N | O |
|---|---|---|---|---|---|---|---|
| Precursor | 10.0 | 20.1 | 28.0 | 12.3 | 4.8 | 10.5 | 14.3 |

Catalyst Preparation

The precursor was pelletized using a 4% aqueous solution of polyvinyl alcohol as a binder, loaded into a stainless steel reactor and purged for one hour under nitrogen at 100° C. and atmospheric pressure. Ten percent of hydrogen sulfide in hydrogen was introduced into the reactor at a rate of 0.75 SCF/hr for each 10 cc of catalyst in the reactor. The temperature in the reactor was then raised to 325° C. and held at this temperature for three hours to form the catalyst after which the temperature in the reactor was lowered to 100° C., the $H_2S/H_2$ gas flow was stopped and the reactor was purged with nitrogen and allowed to cool to room temperature.

Elemental analyses of the catalyst or composition of this invention formed by sulfiding the precursor is set forth below in wt.%.

| Cr | Mo | S | C | H | N |
|---|---|---|---|---|---|
| 15.6 | 33.5 | 37.6 | 3.5 | 0.81 | 1.16 |

Reaction Conditions

About 20 g of the catalyst was loaded into a fixed-bed reactor. Hydrotreating was carried out at the conditions set forth below:
Temperature—325° C.,
Pressure—3.15 MPa,
Hydrogen rate—3000 SCF/bbl,
LHSV—3.0 V/V/Hr.
Liquid product was analyzed for total sulfur by X-ray fluorescence and for nitrogen by combustion analysis. The feedstock used was a light catalytic cycle oil (LCCO) that was about 20 wt.% paraffinic having nominal properties set forth in Table 1.

Hydrotreating Experiment

In this experiment, the results obtained from the catalyst composition of this invention was compared to results obtained from a commercial hydrotreating catalyst comprising nickel molybdate on $\gamma$-$Al_2O_3$. This catalyst contained 18 percent molybdenum oxide and 3.5 percent nickel oxide supported on gamma alumina. The commercial catalyst was sulfided employing the same procedure used to form the catalysts of this invention, except that the temperature was 360° C. for one hour.

The results of these experiments are shown in Tables 2 and 3 and show that the catalyst of this invention is not only a useful hydrotreating catalyst but has higher selectivity for hydrodenitrogenation than the sulfided commercial nickel molybdate on alumina catalyst.

TABLE 1

| LCCO Feed | |
|---|---|
| Gravity (°API) | 18.6 |
| Sulfur, wt. % | 1.4 |
| Nitrogen, ppm | 292 |

| GC distillation | |
|---|---|
| Wt. % | Temp., °C. |
| 5 | 231 |
| 10 | 251 |
| 50 | 293 |
| 70 | 321 |
| 90 | 352 |
| 95 | 364 |

TABLE 2

Hydrotreating Activity for Commercial Nickel Molybdate on Alumina

| Catalyst Hours on Stream | % HDS | % HDN |
|---|---|---|
| 49 | 80.0 | 32.3 |
| 71 | 80.8 | 38.6 |
| 75 | 80.0 | 37.6 |

TABLE 3

Hydrotreating Activity for Catalyst Prepared From Chromium Promoted Thiomolybdate Precursor

| Catalyst Hours on Stream | % HDS | % HDN |
|---|---|---|
| 66 | 50.2 | 78.8 |

The catalyst of this invention was inspected by a number of analytical techniques, as described briefly above.

Electron microscopy of the fresh catalyst prepared in this example has revealed that the molybdenum microcrystallite sizes generally had dimensions less than about 0.1 microns by 0.01 microns. The chromium sulfide was present as distinct regions of amorphous material in which less than 5% of crystalline forms were discernable with the 4 Å point-to-point resolution instrument used.

After the catalyst had been on stream for three days, as shown in Tables 1 and 3, it was removed from the reactor for analysis. Examination of electron micrographs of this composition, taken at a magnification of 680,000X, revealed the presence of many lines 6.2 Å apart and generally not more than 150 Å in length. It is well known in the art [see, for example R. R. Chianelli, International Reviews in Physical Chemistry, (1982), 2(127-165)] that such lines with the 6.2 Å spacings are characteristic of $MoS_2$. $MoS_2$ occurs in layers which are seen to be highly disordered and occurring singly or stacked but in the micrograph the degree of stacking is generally not more than eight stacks and usually not more than four stacks. The $Cr_2S_3$ phase was observed to be completely amorphous. In some cases a small amount of crystalline $Cr_2S_3$ phase was detected, but only as a minority phase. The predominant material, which is the catalytically active composition of this invention, is a mixture of microcrystalline $MoS_2$ or $WS_2$ or mixture thereof with amorphous $Cr_2S_3$.

The catalyst composition of this Example was also analyzed by X-ray diffraction, both fresh and after being on stream for three days. There was no discernable difference in the diffraction patterns. The diffraction patterns obtained were consistent with $MoS_2$ microcrystallites of the size observed by the electron microscope. The X-ray diffraction patterns contained a broad peak between approximately 10 and 15 $2\theta$ which is indicative of stacks of $MoS_2$ crystallites with a stack number of about 4. There was no evidence in the X-ray diffraction (XRD) patterns for any crystalline chromium sulfide phase. The XRD thus supports the electron microscopy results in indicating that the chromium sulfide is amorphous.

Example 2

In this experiment a chromium molybdenum sulfide on alumina catalyst was prepared using the procedure set forth in Example 4 of U.S. Pat. No. 3,265,615. Thus, 24.2 grams of $(NH_4)_6Mo_7O_{24}.4H_2O$(APM) were dissolved in 150 ml of water. One-half of this solution was used to impregnate 26.6 grams of a reforming grade —$Al_2O_3$ that had been calcined to remove water. The impregnate was dried overnight at 100° C. and reimpregnated with the other half of the APM solution. The resulting impregnate was again dried overnight at 100° C. and then calcined in air for four hours at 550° C. To the calcined impregnate was added a hot (80°-100° C.) solution of 20 g of $Cr_2(SO_4)_3$ in 50 ml of water, followed by drying overnight at 100° C. to form 58.7 g of a green colored, chromium molybdate precursor. This precursor was then pelletized and screened to −20 to +40 mesh.

The screened precursor was placed in the reactor and contacted with flowing hydrogen at room temperature. The temperature was then raised to 288° C. and held there for one-half hour, followed by raising the temperature to 450° C., holding for one-half hour and then raised to 510° C. and held at 510° C. for one-half hour. The reactor temperature was then lowered to 316° C., and the hydrogen replaced with a 10% $H_2S$ in $H_2$ mixture. The following $H_2S/H_2$ mixture contacted the precursor for three hours at 316° C. The LCCO feed was then introduced employing the procedure set forth above, again at an LHSV of 3.0 V/V/hr. The results are set forth below in Table 4.

TABLE 4

| Catalyst Hours on Stream | % HDS | % HDN |
| --- | --- | --- |
| 48 | 23.8 | 5.8 |
| 70 | 24.4 | 5.2 |

These results are much different from the results obtained for a chromium molybdenum sulfide catalyst of this invention employing the same feed and reaction conditions set forth in Table 3. Thus, the chromium promoted catalyst of this invention is much superior in both HDS and HDN activity to the chromium promoted catalyst disclosed and claimed in U.S. Pat. No. 3,265,615. These comparative results also established that the catalyst of this invention is a different catalyst from that of U.S. Pat. No. 3,265,615.

Example 3

In this example, the composition of this invention was prepared by precipitating the thiomolybdate of (dien) onto colloidal $Cr_2O_3$, drying and sulfiding. The resultant solid was tested as a hydrotreating catalyst. The amount of $Cr_2O_3$ used was in excess of that amount needed to form the supported species of this invention so that the excess $Cr_2O_3$ served as a support.

5.207 g of $(NH_4)_2MoS_4$ (0.02 m) was dissolved in 50 ml of diethylenetriamine (dien) in an ice bath. A 22 wt.% (0.09 m) aqueous dispersion of colloidal $Cr_2O_3$ (Nyacol), containing 13.69 g of $Cr_2O_3$ was diluted to 200 ml with water and transferred to a 100 ml round bottom flask provided with a mechanical stirrer. The thiomolybdate solution was added slowly with agitation, stopping occasionally to break up any gel formed with a spatula.

The slurry was filtered, the solid washed with acetone and dried in a vacuum at 50° C. A sample of the solid was ground and sieved to 20/40 mesh. This catalyst precursor had the following composition:

| Element | S | Mo | Cr | C | H | N |
| --- | --- | --- | --- | --- | --- | --- |
| wt. % | 3.26 | 3.18 | 19.0 | 18.77 | 6.14 | 14.80 |

The material was sulfided as described in Example 1. It is believed that the final catalyst contained about 60 wt.% chromia.

Evaluation of the composition as a catalyst was carried out in an automated, continuously stirred tank reactor unit consisting of a one liter autoclave, calibrated feed burette, pump, gas-liquid separator, and product liquid collector. In a typical experiment, 20 cc of catalyst were charged in a stainless steel basket which was placed inside the autoclave.

Operating conditions and hydrotreating results are listed in Table 5.

TABLE 5

| Operating Conditions and Hydrotreating Results | |
| --- | --- |
| Feed | LCCO |
| Temperature, °C. | 325 |
| Pressure, MPa | 3.15 |
| Hydrogen Rate, SCF/Bbl | 3000 |
| LHSV, V/V/hr | 1 |
| % HDS | 38 |
| % HDN | 46 |

Example 4

A 34 wt.% suspension of colloidal silica, 147 g, was diluted with 100 g of distilled water. A solution of 26.4 g of $Cr(NO_3)_3.9H_2O$ in 35 g of distilled water was added to this colloidal suspension. A solution of 25.8 g of $(NH_4)_2MoS_4$ in 100 ml ethylenediamine was added dropwise to the silica suspension with constant agitation, and the stirring continued for 20–30 minutes after all the en solution has been added. A precipitate formed which was filtered and dried in a vacuum oven at 50° C., sulfided as in Example 1 and rescreened to 20/40 mesh.

Reaction Conditions

The same reaction conditions were employed as in Example 1. The results shown in Table 6 were obtained.

TABLE 6

| Hydrotreating With Supported Catalyst | | |
| --- | --- | --- |
| Run Length, hrs. | % HDS | % HDN |
| 48 | 36.9 | 35.3 |
| 69 | 32.1 | 24.9 |
| 140 | 33.3 | 25.4 |

While the desulfurization level is much lower that that achieved with a commercial catalyst (see Table 2, Example 1) the denitrogenation obtained with this supported catalyst is about the same order as with commercial catalyst. This shows that the ratio of HDN/HDS activity of the supported catalyst of this invention is higher than that of commercial catalyst.

What is claimed is:

1. As a composition of matter, a supported hydroprocessing catalyst obtained by compositing a quantity of catalyst support material with a hydrated oxide of trivalent chromium and one or more precursor salts and heating said composite at elevated temperature of at least about 250° C. to about 600° C., in the presence of one or more of sulfur-bearing compounds for a time sufficient to form sulfides of chromium, wherein said catalyst support material is selected from the group consisting of alumina, diatomaceous earth, zeolite, silica, activated carbon, magnesia, zirconia, boria, chromia and titania, and wherein said precursor salt contains a tetrathiometallate anion of Mo, W or mixture thereof and a cation comprising the conjugate acid of one or more neutral, nitrogen-containing ligands, at least one of which is a chelating polydentate ligand.

2. The catalyst of claim 1 wherein said ligand is selected from the group consisting of alkyl amine, aryl amines, nitrogen heterocycles and mixtures thereof.

3. The catalyst of claim 2 wherein said support material comprises one or more refractory inorganic oxides.

4. The catalyst of claim 3 wherein ligand comprises an alkyl amine.

5. The catalyst of claim 4 wherein said non-oxidizing atmosphere comprises a mixture of $H_2$ and $H_2S$.

6. A process for preparing a supported hydroprocessing catalyst, said process comprising compositing a quanitity of catalyst support material and a hydrated oxide of trivalent chromium with one or more precursor salts and heating said composite at elevated temperature of at least about 250° C. to about 600° C., in the presence of one or more sulfur-bearing compounds and under oxygen-free conditions for a time sufficient to form sulfide of said trivalent chromium, wherein said catalyst support material is selected from the group consisting of alumina, diatomaceous earth, zeolite, silica, activated carbon, magnesia, zirconia, boria, chromia and titania, and wherein said precursor salt contains a tetrathiometallate anion of Mo, W or mixture thereof and a cation comprising the conjugate acid of one or more neutral, nitrogen-containing polydentate ligands at least one of which is a chelating polydentate ligand.

7. The process of either of claims 6 wherein ligand is selected from the group consisting of alkyl amines, aryl amines, nitrogen heterocycles and mixtures thereof.

8. The process of claim 7 wherein said precursor salt is formed in the presence of a slurry of support material.

9. The process of claim 8 wherein said support material comprises an oxide of trivalent chromium.

10. The process of either of claims 8 or 9 wherein ligand comprises an alkyl amine.

11. The process of claim 10 wherein said non-oxidizing atmosphere comprises a mixture of $H_2$ and $H_2S$.

12. As a composition of matter, a supported hydroprocessing catalyst obtained by compositing a quantity of inorganic refractory oxide support material and a hydrated oxide of trivalent chromium with one or more precursor salts and heating said composite at elevated temperature of at least about 250° C. to about 600° C., in the presence of excess sulfur in the form of one or more sulfur-bearing compounds and under oxygen-free conditions for a time sufficient to form sulfide of said trivalent chromium, wherein said precursor salt is of the general formula ('L) $(Mo_yW_{1-y}S_4)$, wherein y is any value ranging from 0 to 1, wherein L' is the conjugate acid of one or more ligands, L, with a charge sufficient to balance the dinegative charge of the tetrathiometallate anion and wherein ligand L is one or more neutral, nitrogen-containing ligands, at least one of which is a chelating polydentate ligand.

13. The catalyst of claim 12 wherein said precursor salt is formed in the presence of a slurry of particles of support material.

14. The catalyst of either of claims 12 or 13 wherein ligand L is selected from the group consisting of alkyl amines, aryl amines, nitrogen heterocycles and mixtures thereof.

15. A process for preparing a supported hydroprocessing catalyst, said process comprising compositing a quantity of inorganic refractory oxide support material and a hydrated oxide of chromium with one or more precursor salts and heating said composite at elevated temperature of at least about 250° C. to about 600° C., in the presence of hydrogen and hydrogen sulfide for a time sufficient to form sulfide of chromium, wherein said precursor salt is of the general formula ('L) $(Mo_yW_{1-y}S_4)$, wherein y is any value ranging from 0 to 1, wherein L' is the conjugate acid of one or more ligands, L, with a charge sufficient to balance the dinegative charge of the tetrathiometallate anion and wherein ligand L is one or more neutral, nitrogen-containing ligands, at least one of which is a chelating polydentate ligand.

16. The process of claim 15 wherein said precursor salt is formed in the presence of a slurry of particles of support material.

17. The process of either of claims 15 or 16 wherein ligand L is selected from the group consisting of alkyl amines, aryl amines, nitrogen heterocycles and mixtures thereof.

* * * * *